United States Patent
Guillon et al.

(10) Patent No.: US 9,475,999 B2
(45) Date of Patent: Oct. 25, 2016

(54) FLEXIBLE PROCESS FOR TRANSFORMATION OF ETHANOL INTO MIDDLE DISTILLATES

(75) Inventors: Emmanuelle Guillon, Vourles (FR); Nicolas Cadran, Oullins (FR); Natacha Touchais, Vienne (FR); Laurent Bournay, Chaussan (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 1078 days.

(21) Appl. No.: 13/102,283

(22) Filed: May 6, 2011

(65) Prior Publication Data

US 2012/0004481 A1     Jan. 5, 2012

(51) Int. Cl.
 C07C 1/24      (2006.01)
 C10G 3/00      (2006.01)
 C10G 50/00     (2006.01)

(52) U.S. Cl.
 CPC ............... C10G 50/00 (2013.01); C10G 3/49 (2013.01); C10G 3/62 (2013.01);
 (Continued)

(58) Field of Classification Search
 CPC ....... C07C 1/24; C07C 2529/85; C07G 3/00; C01L 1/00; C10G 3/00
 USPC ................................................ 585/240, 639
 See application file for complete search history.

(56) References Cited

U.S. PATENT DOCUMENTS

| | | | |
|---|---|---|---|
| 4,720,600 A * | 1/1988 | Beech, Jr. ................ | C07C 2/12 585/315 |
| 4,727,214 A * | 2/1988 | Uytterhoeven et al. ...... | 585/640 |
| 2007/0287873 A1* | 12/2007 | Coupard et al. ............. | 585/639 |

FOREIGN PATENT DOCUMENTS

EP    2 055 382 A1   5/2009
EP    2055382 A1 *   5/2009
(Continued)

OTHER PUBLICATIONS

EP2055382A1_ENGLISH: a machine translated English document of Guillon et al.*
(Continued)

*Primary Examiner* — In Suk Bullock
*Assistant Examiner* — Youngsul Jeong
(74) *Attorney, Agent, or Firm* — Millen, White, Zelano and Branigan, P.C.

(57) ABSTRACT

The invention describes a process for the production of middle distillate hydrocarbon bases from an ethanol feedstock that is produced from a renewable source that is obtained from biomass, whereby said process comprises a stage for purification of said feedstock, a stage for transformation of said purified feedstock into a light olefinic effluent that comprises at least 30% by weight of olefins that have between four to six carbon atoms relative to the total mass of the formed hydrocarbon compounds, whereby said stage works in the presence of a catalyst that comprises at least one zeolite that is selected from among the zeolites that have a structural type that appears in the following list: CHA, ERI, MTF, AEI, AEL, FER, EUO, MEL, MFS, TON, MTT and the zeolites ZBM-30, ZSM-48, IM-5 and IZM-2, taken by themselves or in a mixture, a stage for separation of the olefinic effluent that is obtained from stage b) in such a way as to eliminate at least a portion of the water that is formed during stage b) to produce at least one hydrocarbon gaseous effluent that for the most part has three or fewer carbon atoms and at least one olefinic hydrocarbon liquid effluent that for the most part has more than four carbon atoms, and a stage for oligomerization of at least a portion of the hydrocarbon effluents that are obtained from stage c) in the presence of an amorphous or zeolitic catalyst that has at least pore openings that contain 10 or 12 oxygen atoms, producing middle distillate hydrocarbon bases.

15 Claims, 2 Drawing Sheets

(52) U.S. Cl.
CPC ............... *C10G 2300/1014* (2013.01); *C10G 2300/301* (2013.01); *C10G 2300/4018* (2013.01); *C10G 2300/4081* (2013.01); *C10G 2400/04* (2013.01); *C10G 2400/08* (2013.01); *C10G 2400/20* (2013.01); *C10G 2400/22* (2013.01); *C10G 2400/28* (2013.01); *Y02E 50/13* (2013.01); *Y02P 30/20* (2015.11)

(56) References Cited

FOREIGN PATENT DOCUMENTS

| | | |
|---|---|---|
| EP | 2 123 736 A1 | 11/2009 |
| FR | 2 901 804 A1 | 12/2007 |
| WO | 2009079213 A2 | 6/2009 |
| WO | WO 2009153420 A1 * | 12/2009 |
| WO | 2010015732 A1 | 2/2010 |
| WO | 2010015733 A1 | 2/2010 |

OTHER PUBLICATIONS

WO2009153420A1_ENGLISH: a machine translated English document of Cabiac et al.*
Search Report, dated Feb. 16, 2010, issued in corresponding application FR 1001951.

* cited by examiner

FLEXIBLE PROCESS FOR TRANSFORMATION OF ETHANOL INTO MIDDLE DISTILLATES

FIELD OF THE INVENTION

This invention relates to the transformation of ethanol, and more particularly bioethanol, into a fuel base.

It relates more particularly to a flexible catalytic process for transformation of ethanol into middle distillates.

PRIOR ART

The demand for use of biomass as a partial replacement for petroleum resources for the synthesis of fuels continues to grow. Thus, the use of bioethanol for the synthesis of bases for fuels is gaining more and more active interest.

Bioethanol is the ethanol of agricultural origin; i.e., it is produced from a renewable source that is obtained from biomass, such as, for example, living plant materials.

The major portion of ethanol is produced by fermentation of sugars contained in the raw materials of plant origin. Starting from sugar plants, the first stage of the transformation consists in obtaining a sugary juice by extraction with hot water for beet scraps or by grinding and pressing for sugar cane. After optional concentration, these juices, or syrup, are introduced into fermenters where the biological transformation of sugars into ethanol takes place with the co-production of $CO_2$ under the action of microorganisms such as, for example, yeasts. The wines that are obtained contain approximately 10% alcohol in water. One distillation stage makes it possible to produce the azeotropic composition of the ethanol/water binary (8% water). So as to achieve complete dehydration, running over a molecular sieve is necessary. In grain plants such as corn and wheat, the sugars that can ferment into ethanol are present in the form of a polymer called starch; for releasing them, a preliminary stage of hydrolysis catalyzed by enzymes is necessary.

New technologies are being developed so as to allow the transformation of the lignocellulosic biomass (wood, grass, straw and other agricultural waste, etc.) into bioethanol.

Ethanol can be used as a biofuel in gasoline engines. This product has significant advantages: high octane number, a miscibility of any proportion in gasoline and a close density. It is an energy vector that is obtained from agriculture and belonging to the family of renewable energies. There are several types of fuels that contain ethanol; most of them are mixtures of gasoline and ethanol in different proportions. They are designated by the letter E followed by the percentage of ethanol in the mixture: for example, E85 represents a fuel that contains 85% ethanol and 15% gasoline. In this nomenclature, E100 designates pure ethanol. Thus, there are E5, E7, E10, E15, E20, E85, E95, and E100 based on the country in which they are located and the use that it is desired to make of them.

In France, the marketing of E85, legally named superethanol, to private individuals has been official since Jan. 1, 2007.

In Europe, the oil-producing countries continue to transform ethanol into ETBE (ethyl tert-butyl ether), which can be incorporated in gasoline to a level of 15%. The ETBE offers the advantage of being better suited to engines. Actually, the direct incorporation of ethanol in gasoline poses certain technical problems: the gasoline/ethanol mixture has an elevated vapor pressure and poorly tolerates the presence of traces of water. These problems can be overcome by a reformulation of gasoline bases and by the elimination of water traces in the tanks. Nevertheless, ETBE is not as good for the environment. The European vehicle fleet is characterized by a large proportion of diesel vehicles; the result is that the gas oil is consumed in a very large proportion relative to gasoline. The biofuels that can be incorporated in the gas oil pool are therefore particularly appreciated in Europe.

The use of ethanol is essentially designed for the production of gasoline and not for the production of gas oils and kerosenes. Another very promising method is the use of ethanol as a biofuel in diesel engines. The E-diesel biofuel is a mixture that consists of diesel between 85% and 95%, anhydrous ethanol (without water), and a package of additives that are specially produced for the stability of the mixture and to eliminate some of the drawbacks of the bioethanol, such as, for example, its low cetane number, its low lubricating power.

Mixing the conventional diesel with ethanol and the additive improves the operation of the combustion and slightly increases the volatility of the fuel. The primary result is the reduction of regulated gas pollutant emissions such as particulates (PM10) and smoke. This reduction is due to the oxygen content of the biofuel that limits the formation of particulates during the combustion of the fuel. Actually, these oxidized molecules make possible a significant improvement of the quality of the combustion by the presence of oxidizer at the very location where the oxidation reaction is done. The mixture of bioethanol with diesel also has as its consequence and primary drawback the reduction of the flash point.

The transformation of ethanol into hydrocarbons is therefore an advantageous way to upgrade the renewable resources to fuels.

There is a great deal of literature on the transformation of methanol-type alcohols into olefins or aromatic compounds for producing a gasoline fraction on acid catalysts, often zeolitic catalysts. Actually, in the 1980s, following the oil crisis, the transformation of methanol into light olefins was the object of scientific and industrial interest. Certain patents are oriented to the production of C2-C3 or C3 olefins, or a gasoline fraction.

Many patents describe the transformation of methanol into light olefins on different acid catalysts, such as, for example, the U.S. Pat. Nos. 4,935,568, 5,714,662, or 4,992,611, or the transformation of methanol into aromatic compounds.

The process for transformation of methanol into light olefins, called the MTO (methanol-to-olefin) process, works at a very high temperature and produces a significant quantity of aromatic compounds and ethylene.

Coupled with an oligomerization process, the transformation from methanol makes it possible to obtain middle distillate fractions (kerosene+gas oil) in two stages (production of light olefins and then oligomerization for converting the olefins into a hydrocarbon olefinic liquid effluent with an elevated mean molecular weight that corresponds to the gas oil and kerosene fractions). There are different patents that claim different processes, often using the zeolite ZSM-5 in the two stages.

The U.S. Pat. Nos. 4,579,999, 5,146,032, 5,177,279 and 4,898,717 describe the MTO+MOGD process (methanol to olefin+olefin to gasoline and distillates).

Other patents describe the transformation of oxidized elements into gasoline and distillates (C4-C12 fraction) in a single dehydration-oligomerization stage. The U.S. Pat. No. 6,372,949 describes such a transformation in a stage that uses a composite catalyst that comprises a one-dimensional 10 MR zeolite selected from the group that is formed by ZSM 22, ZSM 23, ZSM 35, ZSM 48, ZSM 57 and ferrierite, by itself or in a mixture, with a multidimensional zeolite that has a mean pore size, and in particular the zeolite ZSM-5.

The distillate fraction that is obtained, however, is a light middle distillate fraction and consequently cannot be incorporated into the gas oil pool.

The patents of the prior art therefore describe the transformation of oxidized elements, and in particular methanol and/or dimethyl ether, into olefins, followed by the oligomerization of olefins that are obtained for producing a hydrocarbon olefinic effluent with an elevated mean molecular weight and corresponding to gas oil and/or kerosene fractions.

The transformation of methanol into light olefins, however, generates the production of aromatic compounds with a quantity of between 8 and 15% by weight relative to the total mass of the hydrocarbon compounds as described in the U.S. Pat. No. 4,506,106 and can even go up to 50% by weight in the case of the MTG (methanol-to-gasoline) process described in the U.S. Pat. No. 5,602,289. The formation of these aromatic compounds is associated with the formation of paraffinic compounds that have a short hydrocarbon chain. The presence of these aromatic and paraffinic products is detrimental to the production of the gas oil and kerosene fraction with high yields because they reduce the yield of olefins, the only compounds that can be transformed in an effective and advantageous way under the operating conditions of the oligomerization stage.

One objective of this invention is to provide a process for the production of middle distillate hydrocarbon bases (gas oil and/or kerosene) that are stable, can be incorporated into the fuel pool, and have high yields, starting from ethanol produced from renewable sources obtained from biomass (sugar-producing plants, amylase plants, or else lignocellulosic biomass) that is also called bioethanol.

The process according to the invention that implements a scheme that comprises a stage for transformation of an aqueous bioethanol feedstock—produced starting from a renewable source that is obtained from biomass—into olefin followed by an oligomerization stage, with the two stages using specific catalytic systems, makes it possible to minimize the production of aromatic compounds at the end of the first stage and therefore to maximize the production of middle distillate bases, which constitutes both an asset for the refiner and an advantage from the standpoint of lasting development.

OBJECT OF THE INVENTION

This invention therefore describes a process for the production of middle distillate hydrocarbon bases from an ethanol feedstock that is produced from a renewable source that is obtained from biomass, whereby said process comprises at least:
  a) One stage for purification of said feedstock,
  b) One stage for transformation of said purified feedstock obtained from stage a) into a light olefinic effluent that comprises at least 30% by weight of olefins having between four to six carbon atoms relative to the total mass of the hydrocarbon compounds that are formed, whereby said stage works in the presence of a catalyst that comprises at least one zeolite that is selected from among the zeolites that have a structural type that appears in the following list: CHA, ERI, MTF, AEI, AEL, FER, EUO, MEL, MFS, TON, MTT and the zeolites ZBM-30, ZSM-48, IM-5 and IZM-2, taken by themselves or in a mixture,
  c) One stage for separation of the olefinic effluent that is obtained from stage b) in such a way as to eliminate at least a portion of the water that is formed during stage b) and to produce at least one hydrocarbon gaseous effluent that for the most part has three or fewer carbon atoms and at least one olefinic hydrocarbon liquid effluent that for the most part has more than four carbon atoms,
  d) One stage for oligomerization of at least a portion of the hydrocarbon effluents that are obtained from stage c) in the presence of an amorphous or zeolitic catalyst that has at least some pore openings that contain 10 or 12 oxygen atoms, producing middle distillate hydrocarbon bases,
  e) One stage for fractionation of the effluent that is obtained from the oligomerization stage d).

In the description below, olefinic effluent is defined as an effluent that comprises an olefin content that is greater than 50% by weight, preferably greater than 60% by weight, and in a preferred manner greater than 70% by weight relative to the total mass of the hydrocarbon compounds contained in said effluent, whereby the other hydrocarbon compounds are advantageously paraffins, aromatic compounds, and naphthenes.

DETAILED DESCRIPTION OF THE INVENTION

Feedstock

The feedstock that is treated in the process according to the invention is an ethanol feedstock that is produced from a renewable source obtained from biomass, also called bioethanol.

It is therefore a matter of a feedstock that is produced biologically, by fermentation of sugars obtained from, for example, sugar-producing crops (saccharose, glucose, fructose), beet scraps, or else amylase plants (starch), or lignocellulosic biomass or hydrolyzed cellulose (glucose, for the most part, and xylose, galactose), containing variable quantities of water.

Said feedstock is advantageously obtained by fermentation from three sources: 1) sucrose from cane sugar or beet scraps, 2) the starch that is present in grains and tubers, and 3) the cellulose and hemicellulose that are present in wood, grasses, and other lignocellulosic biomass, with starch, cellulose and hemicellulose having to be hydrolyzed into sugars before undergoing a fermentation stage.

The bioethanol feedstock that is used according to the invention therefore for the most part contains ethanol at a level of more than 50% by weight and preferably more than 70% by weight, and it also advantageously contains a water content of greater than 2% by weight, preferably greater than 5% by weight, and in a preferred manner greater than 10% by weight, a content of cationic impurity such as, for example, the ions $Na^+$ $Ca^{2+}$, $Mn^{2+}$, $Fe^{2+}$, $Cu^{2+}$, and $Zn^{2+}$ that is advantageously less than 0.5% by weight, a content of anionic impurity such as, for example, the ions of $Cl^-$, sulfate, nitrite, nitrate, phosphates that is advantageously less than 0.5% by weight, a content of another alcohol, such as, for example, methanol or butanol, that is advantageously less than 10% by weight, and preferably less than 5% by weight, a content of oxidized compounds other than the alcohols, such as, for example, ethers, acids, ketones, aldehydes and/or esters, that is advantageously less than 1% by weight, and a nitrogen and sulfur content that is advantageously less than 0.5% by weight, whereby the percentages by weight are expressed relative to the total mass of said feedstock.

In accordance with the process according to the invention, the feedstock undergoes a purification stage in such a way as to eliminate the cationic and anionic impurities as well as at least a portion of the oxidized compounds to limit the deactivation of the catalyst that is placed downstream.

The purification stage is advantageously implemented by means that are known to one skilled in the art, such as, for example, the use of at least one resin, the adsorption on the solid selected from among the molecular sieves, active carbon, alumina and zeolites, distillation, hydrogenation in the presence of a catalyst based on noble metal, for example nickel, so as to obtain a purified feedstock that responds to the level of impurities compatible with the catalyst.

In accordance with stage b) of the process according to the invention, the purified feedstock that is obtained from stage a) undergoes a stage for transformation into a light olefinic effluent that comprises at least 30% by weight of olefins having between four to six carbon atoms relative to the total mass of the hydrocarbon compounds that are formed, whereby said stage works in the presence of a catalyst that comprises at least one zeolite that is selected from among the zeolites having a structural type that appears in the following list: CHA, ERI, MTF, AEI, AEL, FER, EUO, MEL, MFS, TON, MTT and the zeolites ZBM-30, ZSM-48, IM-5 and IZM-2, taken by themselves or in a mixture.

During this stage, the other oxidized compounds (ethers, acids, ketones, aldehydes and/or esters) that can always be present in the purified bioethanol feedstock are also preferably transformed into hydrocarbons.

According to the invention, stage b) works in the presence of a catalyst that comprises at least one zeolite that is selected from among the zeolites that have a structural type that appears in the following list: CHA, ERI, MTF, AEI, AEL, FER, EUO, MEL, MFS, TON, MTT and the zeolites ZBM-30, ZSM-48, IM-5 and IZM-2, taken by themselves or in a mixture and preferably selected from among the zeolites that have a structural type that appears in the following list: FER, EUO, MEL, MFS, TON, MTT and the zeolites ZBM-30, ZSM-48, IM-5 and IZM-2, taken by themselves or in a mixture and in a very preferred manner from among FER, EUO, TON and the zeolites ZBM-30, ZSM-48, IM-5 and IZM-2, taken by themselves or in a mixture.

In particular, among the FER-structural-type zeolites, the ferrierite zeolite is preferred; among the EUO-structural-type zeolites, the EU-1 zeolite is preferred; and among the TON-structural-type zeolites, the ZSM-22 and NU-10 zeolites are preferred.

Thus, in a preferred manner, said catalyst comprises at least one 10 MR zeolite that is advantageously selected from among the following zeolites: ferrierite, EU-1, ZSM-22, NU-10, ZBM-30, IM-5, ZSM 48 and IZM-2, taken by themselves or in a mixture, preferably from among the following zeolites: ferrierite, EU-1, NU-10, IM-5 and ZBM-30, taken by themselves or in a mixture. According to one preferred embodiment, the preferred zeolite is ferrierite. According to another preferred embodiment, the preferred zeolite is ZBM-30, and in an even more preferred manner, the zeolite is the ZBM-30 that is synthesized in the presence of the triethylenetetramine structuring agent.

According to one advantageous embodiment, said catalyst comprises a zeolite ZBM-30, advantageously synthesized in the presence of the triethylenetetramine structuring agent, in a mixture with NU-10.

The different structural types are described in the Atlas of Zeolite Framework Types, Sixth Revised Edition 2007 (Ch. Baerlocher, L. B. McCusker, D. H. Olson).

The zeolite ZBM-30 is described in the patent EP-A-46 504. The zeolite ZSM 48 is described in Schlenker, J. L., Rohrbaugh, W. J., Chu, P., Valyocsik, E. W., and Kokotailo, G. T. Title: The Framework Topology of ZSM-48: A High Silica Zeolite Reference: Zeolites, 5, 355-358 (1985) Material "ZSM-48."

The zeolite IM-5 is described in the patent FR-2 754 809.

The zeolite IZM-2 is described in the patent application FR-A-2 918 050.

In the case where the zeolite is selected from among FER, EUO, MEL, MFS, TON, MTT and the zeolites ZBM-30, ZSM-48, IM-5 and IZM-2, taken by themselves or in a mixture, said zeolite preferably has an aluminosilicate- or ferro-aluminosilicate-type structure, in a preferred manner an acid structure that has an M/Al atomic ratio that is less than 0.15 and preferably less than 0.05, where M is an alkaline metal and has an Si/X ratio that is greater than 5 with X selected from among iron and aluminum. In a very preferred manner, said zeolite is a 10 MR zeolite, i.e., having at least pore openings that contain 10 oxygen atoms.

In the case where the zeolite is selected from among CHA, ERI, MTF, AEI, and AEL, said zeolite preferably has an aluminophosphate-type and silicoaluminophosphate-type structure that has an Si/(Al+P) atomic ratio that is greater than or equal to 1.

The zeolite that is employed in the catalyst that is used in stage b) of the process according to the invention can advantageously be modified by dealuminification or desilication according to any method of dealuminification or desilication known to one skilled in the art.

Said catalyst that is used in stage b) of the process according to the invention also advantageously comprises at least one oxide-type matrix that is also called a binder. Matrix, according to the invention, is defined as an amorphous or poorly crystallized matrix.

Said matrix is advantageously selected from among the elements of the group that is formed by clays (such as, for example, among the natural clays such as kaolin or bentonite), magnesia, aluminas, silicas, silica-aluminas, aluminates, titanium oxide, boron oxide, zirconia, aluminum phosphates, titanium phosphates, zirconium phosphates, and carbon. Preferably, said matrix is selected from among the elements of the group that is formed by aluminas, silicas, and clays.

In a preferred embodiment, the binder has a macroporous texture as described in the patent US2009088595.

The catalysts that are used in the process according to the invention are advantageously shaped in the form of grains of different shapes and sizes. They are advantageously used in the form of cylindrical or multilobed extrudates such as bilobed, trilobed, or multilobed extrudates of straight or twisted shape, but they can optionally be produced and used in the form of crushed powder, tablets, rings, balls, wheels, or spheres. Preferably, said catalysts are in the form of extrudates or balls.

Stage b) of the process according to the invention advantageously works at a temperature of between 250 and 600° C., preferably between 300 and 600° C., and in a preferred manner between 300 and 500° C., at a pressure of between 0 and 5 MPa, preferably between 0 and 2.5 MPa, and in a preferred manner between 0 and 1 MPa, and at an hourly volumetric flow rate of between 0.1 and 50 $h^1$ and preferably between 0.5 and 15 $h^1$.

In stage b) of the process according to the invention, the catalysts that are used and the operating conditions are selected in such a way as to maximize the production of olefins that have between four and six carbon atoms.

In accordance with the invention, the light olefinic effluent that is produced during stage b) comprises at least 30%, preferably at least 40%, and in a preferred manner at least 50% by weight of olefins that have between four to six carbon atoms relative to the total mass of the hydrocarbon compounds that are formed. In addition to the majority presence of olefins that have between four and six carbon atoms, the light olefinic effluent also advantageously comprises less than 15%, preferably less than 12%, and in a preferred manner less than 10% by weight of compounds that have three carbon atoms, whereby this effluent advantageously consists of propylene and propane, and advantageously less than 8%, preferably less than 6%, and in a preferred manner less than 5% by weight, and in a very preferred manner less than 4% by weight of aromatic compounds that are formed during stage b), whereby the percentages are expressed in terms of percentages by weight relative to the total mass of the hydrocarbon compounds that are formed.

Furthermore, a quantity of water that is greater than 30% and preferably greater than 35% by weight relative to the total mass of the effluent that is produced during stage b) is advantageously produced.

The conversion of the bioethanol feedstock in stage b) is advantageously greater than 90%, preferably 95%, and in a preferred manner greater than 98%.

Conversion of the bioethanol feedstock is defined as the ratio of the difference between the mass flow rate of ethanol ($C_2H_5OH$) at the input and the mass flow rate of ethanol ($C_2H_5OH$) at the output of stage b) to the mass flow rate of bioethanol at the input.

A water-based or paraffin-based diluent that is obtained from a feedstock that is outside of the process according to the invention, such as, for example, paraffins that have a carbon number of between two and eight, can advantageously be added to the bioethanol feedstock after purification in a diluent to feedstock molar ratio, advantageously between 0.5 to 20, for the purpose of stabilizing the catalyst of stage b) of the process according to the invention.

Stage b) for transformation of said purified feedstock into a light olefinic effluent of the process according to the invention is advantageously implemented in at least one fixed-bed, moving-bed or fluidized-bed reactor.

In the case where stage b) is implemented in a fluidized bed, the catalyst will assume the shape of balls, of a size that is advantageously less than 500 microns and preferably less than 300 microns.

In the case where stage b) is implemented in a fixed bed, the regeneration of the catalyst that is used in said stage b) is advantageously carried out under a stream of air, for example by using a recirculation of the combustion air with or without water so as to dilute the oxygen and control the regeneration exothermy. In this case, it is advantageously possible to adjust the oxygen content at the input of the reactor by a supply of air. The regeneration takes place at a pressure between the atmospheric pressure (0 bar, relative) and the reaction pressure. The regeneration temperature is advantageously selected between 400 and 600° C.; it can advantageously vary during regeneration. The end of the regeneration is detected when there is no longer oxygen consumption.

In the case where stage b) is implemented in a moving or fluidized bed, the regeneration of the catalyst is carried out continuously.

In accordance with the invention, the olefinic effluent that is obtained from stage b) undergoes a separation stage c) in such a way as to eliminate at least a portion of the water that is formed during stage b) and to produce at least one gaseous effluent that for the most part has three or fewer carbon atoms and at least one olefinic hydrocarbon liquid effluent that for the most part has more than four carbon atoms.

The separation stage can advantageously be implemented by any method that is known to one skilled in the art, such as, for example, the combination of one or more high- and/or low-pressure and high- and/or low-temperature separator tanks, and/or distillation stages that comprise one or more high- and/or low-pressure distillation and/or stripping columns, by implementing stages for extraction by solvent in association with a zone for distillation, flash and decanting, by the use of molecular sieves or adsorbents whose purpose is the residual elimination of water.

In one preferred embodiment, at least a portion of the middle distillate base, collected before or after hydrogenation and preferably after, can advantageously be recycled in separation stage c).

A portion of the water that is eliminated during stage c) is advantageously recycled upstream from stage b) for transformation of said purified feedstock, being used as a diluent of the purified bioethanol feedstock.

The gaseous effluent that for the most part has three or fewer carbon atoms is an effluent that is rich in ethylene, ethane, propylene and propane. Said effluent advantageously comprises a content of compounds having two and three carbon atoms (C2+C3) that is advantageously greater than 70%, preferably greater than 75%, and in a preferred manner greater than 80% by weight relative to the total mass of said effluent, of which at least 50%, preferably at least 55%, and in a preferred manner at least 60% by weight are compounds that have two carbon atoms, optionally a residual content of compounds that have more than four carbon atoms and that is advantageously less than 30%, preferably less than 25%, and in a preferred manner less than 20% by weight relative to the total mass of said effluent.

In one preferred embodiment, at least a portion, and preferably all, of said gaseous effluent is advantageously recycled upstream from stage b) for transformation of the purified bioethanol feedstock into a light olefinic effluent.

In the case where only a portion of said gaseous effluent is advantageously recycled upstream from stage b) for transformation of the purified feedstock, the other non-recycled portion is sent into oligomerization stage d) according to the invention or is purged.

In another preferred embodiment, all of said gaseous effluent that for the most part has three or fewer carbon atoms is advantageously sent into a reaction section for optional oligomerization, different from oligomerization stage d) according to the invention, comprising either a homogeneous metal catalyst that comprises at least one metal that is selected from among nickel, zirconium, chromium, molybdenum, titanium and iron, whereby said metals are complexed with organic compounds such as, for example, pyridinic or acetonate derivatives, whereby said homogeneous catalysts are known by one skilled in the art, or a heterogeneous catalyst that comprises at least one metal that is selected from among molybdenum, chromium and nickel, taken by itself or in a mixture and a substrate that is selected from among alumina, silica alumina and zeolites, whereby said homogenous catalysts are known to one skilled in the art. In the case where a homogeneous metal catalyst is used, said catalyst is neutralized and eliminated according to any method that is known to one skilled in the art.

The effluent that is obtained from said reaction section for optional oligomerization is advantageously separated in an optional separation stage, implemented according to methods that are known to one skilled in the art.

In the case where the majority production of kerosene-type hydrocarbon base is more particularly desired, said effluent is advantageously separated into an effluent that for the most part consists of hydrocarbons and that has less than nine carbon atoms, i.e., that has more than 60% by weight, preferably more than 70% by weight, of hydrocarbon compound and that has less than nine carbon atoms, whereby the percentages by weight are expressed relative to the total mass of said effluent, and into another effluent that for the most part consists of hydrocarbons and that has more than nine carbon atoms, i.e., that has more than 60% by weight, preferably more than 70% by weight, of hydrocarbon compounds and that has more than nine carbon atoms, whereby the percentages by weight are expressed relative to the total mass of said effluent.

In the case where the majority production of gas-oil-type hydrocarbon base is more particularly desired, said effluent is advantageously separated into an effluent that for the most part consists of hydrocarbons and that has less than 12 carbon atoms, i.e., that has more than 60% by weight, preferably more than 70% by weight, of hydrocarbon compounds and that has less than 12 carbon atoms, whereby the percentages by weight are expressed relative to the total mass of said effluent, and into another effluent that for the most part consists of hydrocarbons and that has more than 12 carbon atoms, i.e., that has more than 60% by weight, preferably more than 70% by weight, of hydrocarbon compounds and that has more than 12 carbon atoms, whereby the percentages by weight are expressed relative to the total mass of said effluent.

Said effluent that for the most part consists of hydrocarbons and that has more than 9 or 12 carbon atoms is advantageously sent into separation stage e), and the effluent that for the most part consists of hydrocarbons and that has less than 9 or 12 carbon atoms is advantageously sent into oligomerization stage d) of the process according to the invention.

The olefinic hydrocarbon liquid effluent that for the most part has more than four carbon atoms obtained from separation stage c) for the most part contains olefins that have between four and six carbon atoms with a content of greater than 50% by weight, preferably greater than 60% by weight, and in a preferred manner greater than 70% by weight, and is produced during stage b) of the process according to the invention, whereby the percentages by weight are expressed relative to the total mass of said effluent.

In accordance with the invention, at least a portion of the hydrocarbon effluents obtained from separation stage c) is sent into an oligomerization stage d).

Preferably, all of the olefinic hydrocarbon liquid effluent that for the most part has more than four carbon atoms obtained from separation stage c) is sent into oligomerization stage d), optionally in a mixture with at least the portion of the hydrocarbon gaseous effluent that for the most part has three or fewer carbon atoms obtained from stage c) and that has not been recycled upstream from stage b).

At least a portion of the light effluent that comprises the C3-C4 compounds and/or at least a portion of the gasoline fraction obtained from fractionation stage e) can advantageously also be recycled in oligomerization stage d) of the process according to the invention and mixed with at least a portion of the hydrocarbon effluents that are obtained from separation stage c).

The partial or total elimination of water during separation stage c) is based on the tolerance to water of the oligomerization catalyst used downstream, in the subsequent oligomerization stage d) of the process according to the invention. The water content of the effluent sent into oligomerization stage d) is advantageously between 0 and 20,000 ppm and preferably between 5 and 5,000 ppm in the case where the catalyst that is placed downstream is a zeolitic-type catalyst and is encompassed between 5 and 1,000 ppm, and preferably between 5 and 500 ppm in the case where the catalyst that is placed downstream is an amorphous catalyst.

In accordance with the invention, at least a portion of the hydrocarbon effluents obtained from separation stage c) undergoes an oligomerization stage d) in the presence of an amorphous or zeolitic catalyst that comprises at least one zeolite that has at least pore openings that contain 10 or 12 oxygen atoms (10 MR or 12 MR), producing middle distillate hydrocarbon bases.

The objective of said oligomerization stage d) is to obtain an olefinic hydrocarbon effluent of an elevated mean molecular weight that corresponds to the middle distillate fractions, whereby said effluent thus can be easily incorporated in a gas oil and/or kerosene pool.

According to the invention, stage d) works in the presence of an amorphous catalyst or comprises at least one zeolite that has at least pore openings that contain 10 or 12 oxygen atoms (10 MR or 12 MR) and are advantageously selected from among aluminiosilicate-type zeolites that have an overall Si/Al atomic ratio that is greater than 10.

According to a preferred embodiment, said oligomerization catalyst is an amorphous catalyst that comprises and preferably consists of an amorphous mineral material that is selected from among silica-aluminas and siliceous aluminas and in a preferred manner the silica aluminas.

According to another preferred embodiment, said oligomerization catalyst comprises at least one zeolite that is selected from among the aluminosilicate-type zeolites that have an overall Si/Al atomic ratio that is greater than 10 and a 10 or 12 MR pore structure, preferably selected from among the zeolites ZSM-5, ZSM-12, NU-86, mordenite, ZSM-22, NU-10, ZBM-30, ZSM-11, ZSM-57, IZM-2, ITQ-6 and IM-5, taken by themselves or in a mixture, preferably from among the zeolites ZSM-5, NU-10 and ZBM-30, taken by themselves or in a mixture; in a very preferred manner, the zeolite is ZBM-30, and in an even more preferred manner, the zeolite is ZBM-30 that is synthesized in the presence of the triethylenetetramine structuring agent.

The zeolite that is employed in the catalyst that is used in stage d) of the process according to the invention can advantageously undergo several post-treatments that are known to one skilled in the art, such that, for example, it can be modified by daluminification or desilication according to any method of dealuminification, external surface passivation or desilication known to one skilled in the art, for the purpose of improving its activity.

Said catalyst that is used in stage d) of the process according to the invention also advantageously comprises at least one oxide-type matrix that is also called a binder. Matrix, according to the invention, is defined as an amorphous or poorly crystallized matrix.

Said matrix is advantageously selected from among the elements of the group that is formed by clays (such as, for example, from among natural clays such as kaolin or bentonite), magnesia, aluminas, silicas, silica-aluminas, aluminates, titanium oxide, boron oxide, zirconia, aluminum phosphates, titanium phosphates, zirconium phosphates, and carbon. Preferably, said matrix is selected from among the elements of the group that is formed by aluminas, clays and silicas; in a more preferred manner, said matrix is selected from among aluminas, and in an even more preferred manner, said matrix is gamma-alumina.

The catalysts that are used in stage d) of the process according to the invention are advantageously shaped in the form of grains of different shapes and sizes. They are advantageously used in the form of cylindrical or polylobed extrudates, such as bilobed, trilobed, or polylobed extrudates of straight or twisted shape, but they can optionally be produced and used in the form of crushed powder, tablets, rings, balls, wheels, and spheres. Preferably, said catalysts are in the form of extrudates with a size of between 1 and 10 mm.

The oligomerization stage d) of at least a portion of the hydrocarbon effluents obtained from separation stage c) is advantageously implemented in at least one fixed-bed reactor.

Stage d) of the process according to the invention advantageously works at a temperature of between 50 and 400° C., preferably between 100 and 350° C., and in a preferred manner between 100 and 300° C., at a pressure of between 2 and 15 MPa, preferably between 2 and 8 MPa, and in a preferred manner between 3 and 8 MPa, and at an hourly volumetric flow rate of between 0.1 and 10 $h^{-1}$, and preferably between 0.4 and 5 $h^1$.

In accordance with the invention, middle distillate hydrocarbon bases (gas oil and/or kerosene) are produced at the end of oligomerization stage d).

The process according to the invention is a flexible process in this sense that the operating conditions and the selection of the catalyst in oligomerization stage d) make it possible to orient the reaction to one or the other of the target products, namely in one case to the majority production of a gas-oil-type hydrocarbon base and in the other a kerosene-type hydrocarbon base.

In the case where the majority production of gas-oil-type hydrocarbon base is more particularly desired, oligomerization stage d) advantageously works in the presence of a catalyst that comprises at least one zeolite that is selected from among the aluminosilicate-type zeolites that have an overall Si/Al ratio that is greater than 10 and a 10 or 12 MR pore structure, and at a temperature of between 200 and 300° C., at a pressure of between 3 and 7 MPa, and at an hourly volumetric flow rate of between 0.1 and 5 $h^{-1}$.

In the case where the majority production of kerosene-type hydrocarbon base is more particularly desired, oligomerization stage d) advantageously works in the presence of an amorphous catalyst, preferably comprising and in a preferred manner consisting of silica alumina at a temperature of between 100 and 300° C., at a pressure of between 2 and 8 MPa, and at an hourly volumetric flow rate of between 0.1 and 5 $h^{-1}$.

The operating conditions of oligomerization stage d) are advantageously adjusted in such a way as to convert between 50 and 99% per pass of the effluent that is sent into said stage and to obtain a yield of middle distillate hydrocarbon bases that is greater than 50%.

The conversion per pass is defined by the difference between the mass flow rate at the input of the olefins that have between four and six carbon atoms and the flow rate at the output of these same olefins divided by the mass flow rate at the input of the olefins that have between four and six carbon atoms.

The middle distillate yield is defined as the ratio between the mass flow rate at the output of compounds that have a boiling point of greater than 150° C. and a final boiling point that is less than 360° C., and the mass flow rate at the input of the olefins that have between four and six carbon atoms.

In accordance with the invention, the effluent that is obtained from oligomerization stage d) comprising the middle distillate hydrocarbon bases undergoes a fractionation stage in at least one distillation column in such a way as to separate said bases into at least two fractions that correspond to the gasoline fractions and middle distillates (gas oils and/or kerosene). A light effluent that comprises the C2-C4 compounds can also be separated to be upgraded in pure form or in a mixture according to the requirements of the refiner. A heavy fraction that has an initial boiling point that is greater than 360° C. can also be advantageously separated. These cited products are in no way restrictive.

At least a portion of the light effluent that comprises the C2-C4 compounds and/or at least a portion of the gasoline fraction obtained from fractionation stage e) can advantageously be recycled in oligomerization stage d) of the process according to the invention.

One of the objectives of this invention is to maximize the yield of middle distillate bases, whereby said light effluent and the gasoline fraction, undesirable, are thus again oliomerized in stage d) of the process according to the invention, making possible the increase of their molecular weight and thus the increase of their boiling point and making them compatible with the desired use.

According to a variant of the process according to the invention, at least a portion of the light effluent that is separated during the fractionation stage e) can advantageously be recycled in stage b) for transformation of the purified feedstock into a light olefinic effluent, and at least a portion, and preferably all, of the gasoline fraction that is obtained from fractionation stage e) is advantageously recycled in oligomerization stage d) of the process according to the invention.

At least a portion, and preferably all, of the middle distillate base (gas oil and/or kerosene) obtained from fractionation stage e) of the effluent obtained from the oligomerization reactor advantageously undergoes a stage for hydrogenation of the olefins that are produced, for the purpose of increasing the cetane number of said middle distillate bases to allow their incorporation into the fuel pool.

Preferably, at least a portion, and preferably all, of the middle distillate base (gas oils and/or kerosene), obtained from fractionation stage e), is brought into contact with a hydrogen-rich gas in the presence of a catalyst that comprises at least one metal from group VIII, advantageously selected from among palladium and nickel, taken by itself or in a mixture, and a substrate that is advantageously selected from among alumina, silica, or silica-alumina.

The catalyst that is employed in the optional hydrogenation stage comprises a palladium content that is advantageously encompassed between 0.1 and 10% by weight and/or a content of nickel, advantageously between 1 and 60% by weight relative to the total mass of the catalyst.

The optional hydrogenation stage advantageously works at a temperature of between 100 and 250° C. at the input of the reactor, at a pressure of between 2 and 5 MPa, and at an hourly volumetric flow rate that is between 0.05 and 8 $h^{-1}$.

The performance of the hydrogenation is validated by measuring the bromine number, which is advantageously at most 5 g of Br/100 g, in the case where it is desired to saturate all of the unsaturated compounds that are present in the fraction that is to be hydrogenated.

The effluent that is obtained from the optional hydrogenation stage for the most part contains hydrocarbons that can be upgraded and incorporated in the kerosene and/or gas oil pool.

An optional separation stage that follows the hydrogenation stage is advantageously implemented for allowing the fractionation into a kerosene fraction and/or a gas oil fraction and/or a fraction that has a boiling point that is greater than 360° C.

At least a portion of the middle distillate base can advantageously be recycled in separation stage c) of the process according to the invention in such a way as to improve the separation of ethylene between the gaseous phase and the liquid phase.

BRIEF DESCRIPTION OF THE FIGURES

FIG. 1 diagrammatically shows the process for production of middle distillate bases from ethanol of this invention in a particular embodiment and without an optional final hydrogenation stage.

Figure 1:
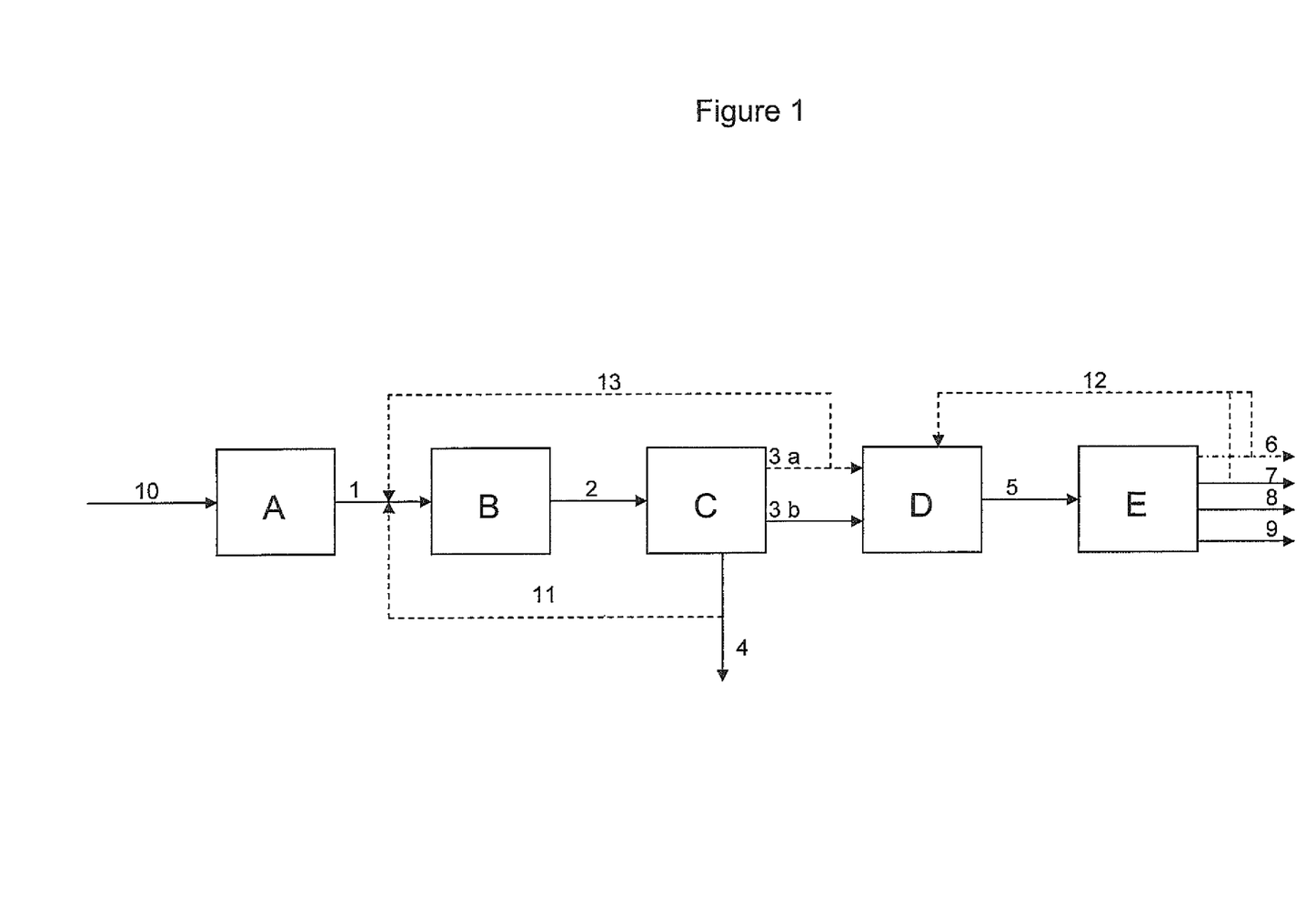
FIGS. 1 and 2 represent schematic flow diagrams of the invention.

In FIG. 1, the ethanol feedstock that is produced from a renewable source that is obtained from the biomass, called bioethanol, is introduced into a reaction zone (A) via the pipe (10) in which said feedstock undergoes a purification stage.

The thus purified feedstock (pipe 1) is then sent into a reaction section (B) in which it undergoes a stage b) for transformation of said purified feedstock that is obtained from stage a) into a light olefinic effluent that comprises at least 30% by weight of olefins having between four to six carbon atoms relative to the total mass of the hydrocarbon compounds that are formed. Said effluent that is obtained from stage b) is then sent into the section (C) via the pipe (2) in which it undergoes a separation stage c) in such a way as to eliminate at least a portion of the water that is formed during stage b) via the pipe (4) and to separate at least one hydrocarbon gaseous effluent that has three or fewer carbon atoms via the pipe (3a) and at least one olefinic hydrocarbon liquid effluent that has more than four carbon atoms via the pipe (3b).

According to one variant of the process of the invention shown in dotted lines, at least a portion of the water that is eliminated during separation stage c) is recycled upstream from the reaction section (B), being used as diluent of the purified bioethanol feedstock, via the pipe (11).

According to another variant of the process of the invention, also shown in dotted lines, at least a portion of said gaseous hydrocarbon effluent that has three or fewer carbon atoms is recycled upstream from stage b) for transformation of the purified feedstock into a light olefinic effluent in the section (B), via the pipe (13).

The other non-recycled portion of said gaseous hydrocarbon effluent (pipe (3a)) and all of the olefinic hydrocarbon liquid effluent that has more than four carbon atoms (pipe (3b)), obtained from separation stage c), are sent into a reaction section (D) in which these hydrocarbon effluents undergo an oligomerization stage that produces middle distillate hydrocarbon bases. The effluent that is obtained from oligomerization stage d) is then sent into a fractionation section (E), in which it is separated into a light effluent that comprises the C2-C4 compounds via the pipe (6), into a gasoline fraction via the pipe (7), and into a middle distillate fraction (kerosene, via the pipe (8) and gas oil via the pipe (9)) to be incorporated into the fuel pool.

According to an embodiment that is shown in dotted lines, at least a portion of the light effluent that comprises the C2-C4 compounds and at least a portion of the gasoline fraction are recycled in stage d) via the pipe (12).

Figure 2:
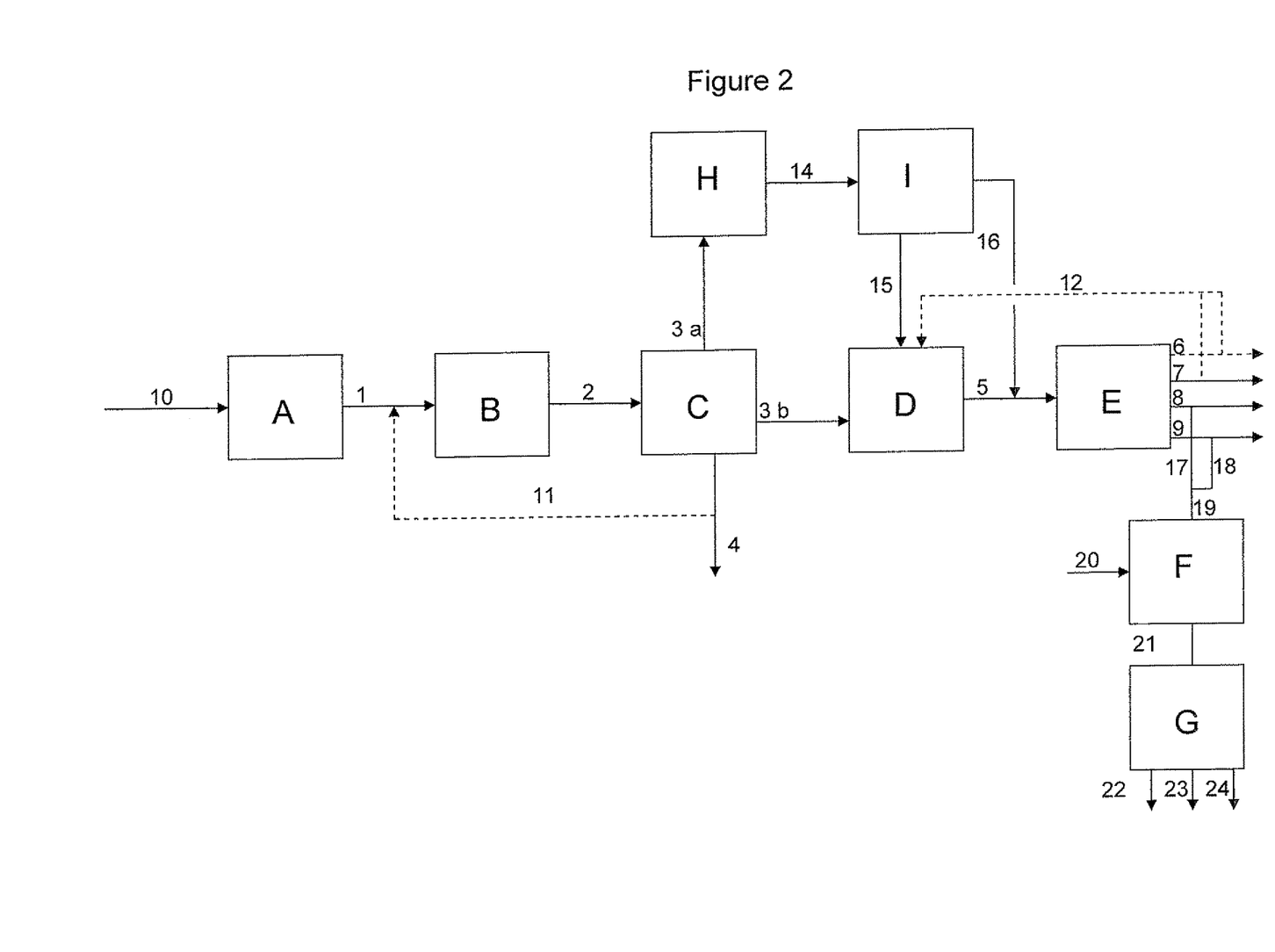

FIG. 2 diagrammatically shows another variant of the process of the invention, including the optional final hydrogenation stage as well as a particular treatment of the gaseous hydrocarbon effluent that has three or fewer carbon atoms, obtained from separation stage c).

Up to separation section (C), the description of FIG. 2 is identical to that of FIG. 1.

All of the olefinic hydrocarbon liquid effluent that has more than four carbon atoms, obtained from section (C), is sent, via the pipe (3b), into the oligomerization section (D) that produces middle distillate hydrocarbon bases via the pipe (5).

All of the hydrocarbon gaseous effluent that has three or fewer carbon atoms is sent, via the pipe (3a), into a reaction section (H) in which it undergoes an oligomerization stage on a homogeneous metal catalyst or on a heterogeneous catalyst. The effluent that is obtained from the oligomerization section (H) is then sent into a fractionation section (I) via the pipe (14) in which it is separated into an effluent that for the most part consists of hydrocarbons and that has less than nine carbon atoms via the pipe (15) and into an effluent that for the most part consists of hydrocarbons and that has more than nine carbon atoms via the pipe (16), in the case where the production of kerosene-type hydrocarbon base is more particularly desired.

The effluent that for the most part consists of hydrocarbons and that has less than nine carbon atoms is then sent in its entirety, via the pipe (15), into the oligomerization section (D), and the effluent that for the most part consists of hydrocarbons and that has more than nine carbon atoms is sent, via the pipe (16), in a mixture with the middle distillate hydrocarbon base effluent (pipe (5)) into the fractionation section (E) in which it is separated into a light effluent that comprises the C2-C4 compounds via the pipe (6), into a gasoline fraction via the pipe (7), and into a middle distillate fraction (kerosene via the pipe (8) and gas oil via the pipe (9)).

At least a portion of the gas oil bases (pipe (18) and kerosene (pipe (17)) are mixed in the pipe (19) and sent into a section (F) for hydrogenation of the olefins that are produced, whereby said section is supplied with hydrogen via the pipe (20).

The effluent that is obtained from the optional hydrogenation stage via the pipe (21) for the most part contains hydrocarbons that can be upgraded and incorporated in the kerosene and gas oil pool. Said effluent is sent via the pipe (21) into a separation section (G) that makes possible the fractionation into a kerosene fraction (pipe 22), into a gas oil fraction (pipe 23), and into a fraction that has a boiling point that is greater than 360° C. (pipe 24).

The following examples illustrate the invention without limiting its scope.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the foregoing and in the following examples, all temperatures are set forth uncorrected in degrees Celsius and, all parts and percentages are by weight, unless otherwise indicated.

EXAMPLES

Example 1

According to the Invention

The scheme according to the invention is implemented in Example 1 without recycling the gaseous effluent that comprises the compounds that have three or fewer carbon atoms (C2+C3) and that is obtained from separation stage c).

Description of the Bioethanol Feedstock

The feedstock that is used in these examples is a bioethanol feedstock that has been purified by a series of stages of distillation and running over molecular sieves so as to meet the following specifications:

TABLE 1

Description of the Purified Feedstock

| Content in % by Weight | |
| --- | --- |
| EtOH, % by Weight | 99% |
| Methanol | <0.05% |
| Butanol | <0.1% |
| Other Alcohols | <0.05% |
| Total Content of Alcohol Other than Ethanol, % by Weight | <0.2% |
| Oxidized Compounds Other than Alcohols | <0.1% |
| H2O, % by Weight | <1% |
| Cationic Impurities, Total % by Weight | <0.005% |
| Anionic Impurities, Total % by Weight | <0.005% |

Stage b): Transformation of the Feedstock

The purified feedstock next undergoes a stage for transformation into a light olefinic effluent in the presence of the zeolitic catalyst C1 described below. It is mixed with a portion of the water that is produced in separation stage c) in such a way as to obtain a molar ratio of 2.

In contrast, no recycling of the gaseous effluent that comprises the compounds that have three or fewer carbon atoms (C2+C3) and is obtained from separation stage c) is implemented.

Preparation of the Catalyst C1 that is Used in Stage b)

The commercial ferrierite zeolite of the Si/Al ratio that is equal to 20 in its NH4+ form is introduced into a fixed-bed reactor. The catalyst is calcined under dry air at 450° C. for 3 hours in such a way as to decompose the ammonium ion into ammonia and H+.

The catalyst C1 is prepared by mixing the thus obtained ferrierite zeolite with an SB3-type alumina that is provided by the Condea Company. The mixed paste is then extruded through a die with a 1.4 mm diameter. The thus obtained extrudates are dried at 120° C. for 5 hours and then calcined under dry air at 500° C. for 2 hours under air. The content by weight of zeolite is 40% by weight.

Stage b) of the process according to the invention is implemented in such a way as to maximize the production of olefins that have between four and six carbon atoms.

Stage b) works at a temperature of 325° C., at a pressure of 0.5 MPa, and at an hourly speed by weight of 2 h$^{-1}$.

The distribution of the hydrocarbon compounds produced per carbon number during stage b) and the composition of the light olefinic effluent produced at the end of stage b) are measured by gas phase chromatography (GPC) and provided in Tables 2 and 3.

TABLE 2

Distribution of the Hydrocarbon Compounds Produced per Carbon Number of the Light Olefinic Effluent at the Output of Stage b)

| Compounds | % by Weight Relative to the Total Mass of the Hydrocarbon Compounds Formed |
| --- | --- |
| C2 | 30 |
| C3 | 5.7 |
| C4-C6 | 57.0 |
| Comprising | 87.0% Olefins in C4-C6 Fraction |
| C7+ | 7.3 |

C2 = Hydrocarbon compounds that have two carbons
C3 = Hydrocarbon compounds that have three carbons (propylene and/or propane)
C4-C6 = Hydrocarbons that have between four and six carbon atoms
C7+ = Hydrocarbons that have seven or more carbons

TABLE 3

Composition of the Light Olefinic Effluent Produced at the End of Stage b)

| Types of Compounds | % by Weight Relative to the Total Mass of the Hydrocarbon Compounds Formed |
| --- | --- |
| Olefins | 86 |
| Aromatic Compounds | 1.6 |
| Paraffins and Naphthenes | 12.4 |

The conversion of ethanol is 99.5%.

Stage c): Separation.

The light olefinic effluent that is obtained from stage b) next undergoes a separation stage in such a way as to eliminate at least a portion of the water that is formed during stage b).

The separation stage is implemented in two successive separator tanks. In a first step, the light olefinic effluent that is obtained from stage b) undergoes a flash separation in a first separator tank at 40° C. and 0.57 MPa at the end of which three phases are obtained: a gaseous phase, a liquid hydrocarbon phase, and an aqueous phase. A portion of the water that is obtained is recycled in stage b) in such a way as to obtain the dilution ratio of the feedstock of stage b). The liquid hydrocarbon phase is sent into the oligomerization reactor d), and the gaseous phase undergoes a second flash separation in a second separator tank that is cooled to 5° C. at the end of which three phases are obtained: a gaseous phase, a hydrocarbon liquid phase, and an aqueous phase.

The gaseous phase that constitutes the gaseous hydrocarbon effluent that for the most part has three or fewer carbon atoms is sent in its entirety into oligomerization stage d). The hydrocarbon liquid phase is also sent into oligomerization stage d), and the aqueous phase is sent to the water treatment.

The olefinic hydrocarbon liquid effluent that for the most part has more than four carbon atoms therefore consists of two liquid hydrocarbon phases, obtained at the end of the flash separations in the separator tanks at 40° C. and at 5° C.

The feedstock of the oligomerization reactor consists of the gaseous hydrocarbon effluent that for the most part has three or fewer carbon atoms as well as the olefinic hydrocarbon liquid effluent that for the most part has more than four carbon atoms, after running over 3A-type molecular sieves to reach a water content that is less than 10 ppm.

Stage d): Oligomerization.

The feedstock that enters into oligomerization stage d) is therefore the effluent that is obtained from stage b) and is separated from water.

Oligomerization stage d) works in the presence of a zeolitic catalyst C2 that is described below and at a temperature of 250° C., at a pressure of 5 MPa, and at an hourly speed by weight of 1 h$^{-1}$.

Preparation of the Catalyst C2 Used in Stage d)

The commercial zeolite ZSM-5 with an Si/Al ratio that is equal to 40 in its NH4+ form is introduced into a fixed-bed reactor. The catalyst is calcined under dry air at 450° C. for 3 hours in such a way as to decompose the ammonium ion into ammonia and H$^+$.

The temperature of the reactor is then brought to 150° C., and then a partial pressure of 0.15 bar of TEOS (Si(OEt)$_4$) is added in a nitrogen stream. After 2 hours of reaction, the zeolite is stripped for 2 hours at 150° C. to evacuate the TEOS that has not reacted. The decomposition of TEOS is done under air at 450° C. for 3 hours, which makes possible the formation of a layer of amorphous silica on the surface of the catalyst.

The catalyst C2 is prepared by mixing the thus obtained zeolite ZSM-5 with an SB3-type alumina that is provided by the Condea Company. The mixed paste is then extruded through a die with a 1.4 mm diameter. The thus obtained extrudates are dried at 120° C. for 5 hours, and then calcined under dry air at 500° C. for 2 hours under air. The content by weight of zeolite is 60% by weight.

The effluent that is obtained from oligomerization stage d) next undergoes a fractionation stage and is then expanded at 2.1 MPa and at 150° C. where two phases are produced: a liquid phase and a gaseous phase. The latter that are obtained are then cooled to 40° C.: the condensed portion is then mixed with the liquid phase that is obtained at 2.1 MPa and at 150° C. This mixture then constitutes the feedstock of the distillation column. The vapor phase, which has not been condensed at 40° C., makes it possible to eliminate a stream that is rich in C2 compounds (70 mol %). The feedstock of the column is then fractionated into several products: A vapor stream that is rich in C2, a light effluent that is rich in C3-C4, a gasoline fraction, and a gas oil and kerosene middle distillate base. The yields of the different products that are obtained are indicated in Table 4.

TABLE 4

Yields

| | % by Weight |
|---|---|
| C2 | 30 |
| C3-C4 | 6 |
| Gasoline Base | 17 |
| Middle Distillate Base (Kerosene and Gas Oil) | 47 |

Starting from a ton of pure ethanol, 287 kg of middle distillate bases is obtained as well as 103 kg of gasoline base.

Example 2

According to the Invention

The scheme according to the invention is implemented in Example 2 with recycling of a gaseous effluent that comprises the compounds that have three or fewer carbon atoms (C2+C3) and is obtained from separation stage c).

The same purified bioethanol feedstock, as in Table 1 of Example 1, undergoes a stage for transformation into a light olefinic effluent in the presence of the same zeolitic catalyst C1 described above. It is mixed with a portion of the water that is produced in separation stage c) in such a way as to obtain a molar ratio of 2.

The entire gaseous effluent that comprises the compounds that have three or fewer carbon atoms (C2+C3) and is obtained from separation stage c) is also recycled in stage b).

Stage b): Transformation of the Feedstock

Stage b) of the process according to the invention is implemented in such a way as to maximize the production of olefins that have between four and six carbon atoms under the same conditions as those of stage b) of Example 1, namely: at a temperature of 325° C., at a pressure of 0.5 MPa, and at an hourly speed by weight of 2 h$^{-1}$.

The distribution of the hydrocarbon compounds produced per carbon number during stage b) and the composition of the light olefinic effluent produced at the end of stage b) are measured by gas phase chromatography (GPC) and are provided in Tables 5 and 6.

TABLE 5

Distribution of Hydrocarbon Compounds Produced per Carbon Number of the Light Olefinic Effluent at the Output of Stage b)

| Compounds | % by Weight Relative to the Total Mass of the Hydrocarbon Compounds Formed |
|---|---|
| C2 | 35.9 |
| C3 | 13.2 |
| C4-C6 | 45.4 |
| Comprising | 82.6% C4-C6 Olefins |
| C7+ | 5.5 |

C2 = Hydrocarbon compounds that have two carbons
C3 = Hydrocarbon compounds that have three carbons (propylene and/or propane)
C4-C6 = Hydrocarbons that have between four and six carbon atoms
C7+ = Hydrocarbons that have seven or more carbons

TABLE 6

Composition of the Light Olefinic Effluent that is Produced at the End of Stage b)

| Types of Compounds | % by Weight Relative to the Total Mass of the Hydrocarbon Compounds Formed |
|---|---|
| Olefins | 64.9 |
| Aromatic Compounds | 1.3 |
| Paraffins and Naphthenes | 33.8 |

The conversion of the ethanol feedstock in stage b) is 99.9%.

Stage c): Separation.

The light olefinic effluent that is obtained from stage b) next undergoes a separation stage in such a way as to eliminate at least a portion of the water that is formed during stage b) and to produce a gaseous effluent that for the most part has three or fewer carbon atoms and at least one olefinic hydrocarbon liquid effluent that for the most part has more than four carbon atoms.

The separation stage is implemented in two successive separator tanks. In a first step, the light olefinic effluent that is obtained from stage b) undergoes a flash separation in a first separator tank at 40° C. and 0.57 MPa at the end of which three phases are obtained; a gaseous phase, a liquid hydrocarbon phase, and an aqueous phase. A portion of the water that is obtained is recycled in stage b) in such a way as to obtain the dilution ratio of the feedstock of stage b). The liquid hydrocarbon phase is sent into the oligomerization reactor d) and the gaseous phase undergoes a second flash separation in a second separator tank that is cooled to 5° C. at the end of which three phases are obtained: a gaseous phase, a hydrocarbon liquid phase, and an aqueous phase. The gaseous phase that constitutes the gaseous hydrocarbon effluent that for the most part has three or fewer carbon atoms is then recycled in reaction stage b), taking into consideration a very weak purge, set at 6% by mass of said gaseous phase that is produced. As for the hydrocarbon liquid phase, it is also sent into the reaction zone for oligomerization d); the aqueous phase is sent to the water treatment.

The olefinic hydrocarbon liquid effluent that for the most part has more than four carbon atoms consists of two liquid hydrocarbon phases, obtained at the end of the flash separations in the separator tanks at 40° C. and at 5° C.

The composition of the gaseous hydrocarbon effluent that for the most part has three or fewer carbon atoms is provided in Table 7.

TABLE 7

Composition of the Gaseous Hydrocarbon Effluent that for the Most Part has Three or Fewer Carbon Atoms

|  | % by Weight of Effluent |
| --- | --- |
| C2 | 63 |
| C3 | 18 |
| C2 + C3 | 81 |
| C4 | 10.4 |
| C5+ | 8.6 |

The entire olefinic hydrocarbon liquid effluent that has more than four carbon atoms is sent into oligomerization stage d) after running over a 3A-type molecular sieve to reach a water content that is less than 10 ppm.

Stage d): Oligomerization.

In Table 8, the composition of the feedstock that enters into oligomerization stage d) is indicated.

TABLE 8

Feedstock of Stage d)

|  | % by Weight |
| --- | --- |
| C2 + C3 | 10.0 |
| C4-C6 | 78.0 |
|  | Including 84% Olefins |
| C7+ | 12.0 |

Oligomerization stage d) works in the presence of the same C2 zeolitic catalyst described in Example 1 and under the same operating conditions, namely at a temperature of 250° C., at a pressure of 5 MPa, and at an hourly speed by weight of 1 h-1.

The effluent that is obtained from oligomerization stage d) next undergoes a fractionation stage and is then expanded at 2.1 MPa and at 150° C. where two phases are produced: a liquid phase and a gaseous phase. The latter that is obtained is next cooled at 40° C.: the condensed part is then mixed with the liquid phase that is obtained at 2.1 MPa and at 150° C. This mixture then constitutes the feedstock of the distillation column. The vapor phase, which has not been condensed at 40° C., makes it possible to eliminate a stream that is rich in C2 compounds (70 mol %). The feedstock of the column is next fractionated into several products: a vapor stream that is rich in C2, a light effluent that is rich in C3-C4, a gasoline fraction, and a gas oil and kerosene middle distillate base. The yields of the different products that are obtained are indicated in Table 9.

TABLE 9

Yields

|  | % by Weight |
| --- | --- |
| C2 | 4.3 |
| C3-C4 | 11.2 |
| Gasoline Base | 21.6 |
| Middle Distillate Base (Kerosene and Gas Oil) | 62.9 |

The recycling of the gaseous effluent that comprises the compounds that have three or fewer carbon atoms (C2+C3) and is obtained from separation stage c) makes it possible to maximize the yield of middle distillates.

Thus, starting from one ton of pure ethanol, 371 kg of middle distillate bases is obtained as well as 127 kg of gasoline base.

Example 3

For Comparison

The comparative example employs a scheme in which a C3 catalyst with a ZSM-5 zeolite base is used both in a first stage for transformation of the feedstock into light olefinic effluent and then in a second stage for oligomerization of the effluent that is obtained from the preceding stage, whereby the two stages are implemented under the same operating conditions as those of Examples 1 and 2.

Preparation of the Catalyst C3 Used in Stage b)

The commercial zeolite ZSM-5 with an Si/Al ratio that is equal to 120 in its $NH_4^+$ form is introduced into a fixed-bed reactor. The catalyst is calcined under dry air at 450° C. for 3 hours in such a way as to decompose the ammonium ion into ammonia and $H^+$.

The catalyst C3 is prepared by mixing the thus obtained zeolite ZSM-5 with an SB3-type alumina that is provided by the Condea Company. The mixed paste is then extruded through a die with a 1.4 mm diameter. The thus obtained extrudates are dried at 120° C. for 5 hours and then calcined under dry air at 500° C. for 2 hours under air. The content by weight of zeolite is 40% by weight.

The same purified bioethanol feedstock, as in Table 1 of Example 1, undergoes a stage for transformation into a light olefinic effluent in the presence of the zeolitic catalyst C3 described above. The operating conditions are identical to those of stage b) of Examples 1 and 2.

The distribution of the hydrocarbon compounds produced per carbon number during stage b) and the composition of the light olefinic effluent produced at the end of stage b) are measured by gas phase chromatography (GPC) and provided in Tables 10 and 11.

TABLE 10

Distribution of the Hydrocarbon Compounds Produced Per Carbon Number of the Light Olefinic Effluent at the Output of the Transformation Stage b)

| Compounds | % by Weight Relative to the Total Mass of the Hydrocarbon Compounds Formed |
| --- | --- |
| C2 | 10 |
| C3 | 9.2 |
| C4-C6 | 46.8 |
| Comprising | 47.3% Olefins |
| C7+ | 34.0 |

TABLE 11

Composition of the Light Olefinic Effluent Produced at the End of Stage b)

| Types of Compounds | % by Weight Relative to the Total Mass of the Hydrocarbon Compounds Formed |
|---|---|
| Olefins | 45.0 |
| Aromatic Compounds | 18.6 |
| Paraffins and Naphthenes | 36.4 |

It is noted that the use of catalyst C3 with a ZSM-5 base brings about the formation of a significant quantity of aromatic compounds.

A separation stage as described in Example 2 is implemented before a stage for oligomerization of the effluent that is separated in the presence of catalyst C3 and under conditions that are identical to stage d) of Examples 1 and 2. The effluent that is obtained from oligomerization stage d) then undergoes a fractionation stage, and the yields of different products that are obtained are indicated in Table 12.

TABLE 12

Yields

| | % by Weight |
|---|---|
| C2 | 10 |
| C3-C4 | 16.2 |
| Gasoline Base | 44.4 |
| Middle Distillate Base (Kerosene and Gas Oil) | 29.4 |

Starting from one ton of pure ethanol, 180 kg of middle distillate bases is obtained as well as 271 kg of gasoline base.

It is therefore noted that the scheme according to the invention, employing specific catalysts in different stages, makes it possible to maximize the yield of middle distillates obtained. In particular, the use of a catalyst according to the invention in stage b) makes it possible to increase significantly the quantity of middle distillate bases obtained: the gain that is produced is 59% in Example 1, employing a catalyst according to the invention in stage b) relative to Example 3 that employs in its stage b) a ZSM-5-based catalyst that is not in accordance with the invention.

The entire disclosures of all applications, patents and publications, cited herein and of corresponding FR application Ser. No. 10/01,951, filed May 6, 2010, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the production of middle distillate hydrocarbon bases from an ethanol feedstock that is produced from a renewable source that is obtained from biomass, said process comprising at least:
    a) purification of said ethanol feedstock to produce a purified feedstock,
    b) transformation of said purified feedstock obtained from a) into an olefinic effluent comprising at least 50% by weight of olefins having between four to six carbon atoms relative to the total mass of the hydrocarbon compounds that are formed, whereby said transformation is conducted in the presence of a catalyst comprising at least one ferrierite zeolite,
    c) separation of the olefinic effluent that is obtained from b) by eliminating at least a portion of water that is formed during b) and thereafter producing at least one hydrocarbon gaseous effluent that for the most part has three or fewer carbon atoms and at least one olefinic hydrocarbon liquid effluent that for the most part has more than four carbon atoms,
    d) oligomerization of at least a portion of the hydrocarbon gaseous effluent and a portion of the olefinic hydrocarbon liquid effluent obtained from c) in the presence of a zeolitic catalyst comprising ZSM-5, NU-10, or ZBM-30 or a mixture thereof, producing an effluent comprising middle distillate hydrocarbon bases, and
    e) fractionation of the effluent that is obtained from d).

2. The process according to claim 1, in which the transformation b) is conducted at a temperature of between 250 and 600° C., at a pressure of between 0 and 5 MPa, and at an hourly volumetric flow rate of between 0.1 and 50 h$^{-1}$.

3. The process according to claim 1, in which at least a portion of said hydrocarbon gaseous effluent obtained from the separation c) is recycled to the transformation b).

4. The process according to claim 1, in which all of said hydrocarbon gaseous effluent obtained from the separation c) is sent to the oligomerization d).

5. The process according to claim 4, in which the effluent that is obtained from said oligomerization d) is separated into an effluent that for the most part contains hydrocarbons having fewer than nine carbon atoms and into another effluent that for the most part contains hydrocarbons having more than nine carbon atoms.

6. The process according to claim 4, in which the effluent that is obtained from said oligomerization d) is separated into an effluent that for the most part contains hydrocarbons having fewer than 12 carbon atoms and into another effluent that for the most part contains hydrocarbons having more than 12 carbon atoms.

7. The process according to claim 5, in which said effluent that for the most part contains hydrocarbons having more than 9 carbon atoms is sent into the fractionation e), and the another effluent that for the most part contains hydrocarbons having fewer than 9 carbon atoms is sent into the oligomerization d).

8. The process according to claim 1, in which all of the olefinic hydrocarbon liquid effluent obtained from the separation c) is sent into the oligomerization d), in a mixture with at least the portion of the hydrocarbon gaseous effluent obtained from the separation c) and that has not been recycled to the transformation b).

9. The process according to claim 1, in which the zeolitic catalyst that is used in the oligomerization step d) comprises silica alumina.

10. The process according to claim 1, in which said zeolitic catalyst that is used in the oligomerization d) comprises a zeolite that is ZSM-5, NU-10, and ZBM-30, taken by themselves or in a mixture.

11. The process according to claim 1, in which a stream comprising C2-C4 compounds and a stream comprising gasoline fraction are obtained from the fractionation e), and thereafter at least a portion of the stream comprising C2-C4 compounds and/or at least a portion of the stream comprising gasoline fraction is recycled to the oligomerization d).

12. The process according to claim 1, in which a stream comprising middle distillate base is obtained from the fractionation e), and thereafter at least a portion of the stream comprising middle distillate base undergoes hydrogenation in the presence of a catalyst that comprises at least one of palladium or nickel, taken by itself or in a mixture, and a substrate that is alumina, silica or silica-alumina to produce a hydrogenation effluent.

13. The process according to claim 12, in which a separation is implemented for the hydrogenation effluent to produce a kerosene fraction and/or a gas oil fraction and/or a fraction that has a boiling point that is higher than 360° C.

14. The process according to claim 12, in which at least a portion of the stream comprising middle distillate base is recycled to the separation c).

15. The process according to claim 6, in which said effluent that for the most part contains hydrocarbons having more than 12 carbon atoms is sent into the fractionation e), and the another effluent that for the most part contains hydrocarbons having fewer than 12 carbon atoms is sent into the oligomerization d).

* * * * *